US 6,747,425 B2

(12) United States Patent
Marshall, III et al.

(10) Patent No.: US 6,747,425 B2
(45) Date of Patent: Jun. 8, 2004

(54) SYSTEM FOR SHARING POWER AND SIGNAL PINS ON A MOTOR CONTROLLER

(75) Inventors: Sumner B. Marshall, III, Dunbarton, NH (US); Mark E. Collins, Webster, NH (US)

(73) Assignee: Asahi Kasei Microsystems Co. LTD, Tokyo (JP)

( * ) Notice: Subject to any disclaimer, the term of this patent is extended or adjusted under 35 U.S.C. 154(b) by 0 days.

(21) Appl. No.: 10/246,950

(22) Filed: Sep. 19, 2002

(65) Prior Publication Data

US 2003/0137261 A1 Jul. 24, 2003

Related U.S. Application Data

(60) Provisional application No. 60/351,490, filed on Jan. 24, 2002.

(51) Int. Cl.[7] .............................................. H02K 23/00
(52) U.S. Cl. ................... 318/254; 318/569; 318/560; 318/650; 318/567
(58) Field of Search ................................. 318/569, 560, 318/650, 635, 652, 653, 567, 254, 138, 439

(56) References Cited

U.S. PATENT DOCUMENTS

| 3,735,378 | A |   | 5/1973 | McNamee |
|---|---|---|---|---|
| 4,677,308 | A |   | 6/1987 | Wroblewski et al. |
| 5,247,239 | A |   | 9/1993 | Yamamura et al. |
| 5,349,275 | A |   | 9/1994 | Muller |
| 5,528,721 | A |   | 6/1996 | Searcy, II et al. |
| 5,947,691 | A | * | 9/1999 | Brown et al. ............... 417/44.1 |
| 6,300,736 | B1 |   | 10/2001 | De Winter et al. |
| 2002/0008513 | A1 |   | 1/2002 | Hiligsmann et al. |

FOREIGN PATENT DOCUMENTS

JP          04-317598          9/1992

OTHER PUBLICATIONS

Laulanet, Francois & Marshall, Brad, Solving Cooling Fan Problems with a Smart Sensor, Piezo Sensors, Jun. 2000, pp. 1–8.
US79 Series CMOS Power Hall IC Data Sheet, Melexis Microeletronic Integrated Systems, Jan. 23, 2001, pp.1–4.
Marshall Brad & Kawaji Ted, DC cooling fan controller IC eliminates components and failure mechanisms, International IC –China Conference Proceedings, pp. 320–327.

* cited by examiner

Primary Examiner—Karen Masih
(74) Attorney, Agent, or Firm—Maine & Asmus

(57) ABSTRACT

The invention in the simplest form is a technique to provide for sharing of power and signal pins on a motor controller. The switching simply follows the magnetic switching detected by the Hall sensor as the motor magnet passes and uses a diode or resistor instead of a switch. The power transistors are respectively connected to a voltage regulator through a diode or resistor and there are no switches in the circuit. To avoid simultaneous switching, one embodiment is designed by turning "On" slowly and turn "Off" quickly. Slow "On" is accomplished by using a resistor/capacitor (RC) delay such that the gate drive ramps slowly. Fast "OFF" is obtained by discharging the gate capacitance with an N-CH transistor that bypasses the RC delay.

22 Claims, 13 Drawing Sheets

SYSTEM FOR SHARING POWER AND SIGNAL PINS ON A MOTOR CONTROLLER

CROSS REFERENCE TO RELATED APPLICATIONS

The present application claims priority under 35 §U.S.C. 119(e) from U.S. Provisional Patent Application Serial No. 60/351,490 filed on Jan. 24, 2002, which is incorporated herein for all purposes.

BACKGROUND OF THE INVENTION

1. Field of the Invention

The present invention relates to motor controllers, and more specifically, to the sharing of signal and power pins on a motor controller.

2. Background Art

The direct current (DC) motor was one of the earliest machines used to convert electrical power into mechanical power. A permanent magnet (PM) converts electrical energy into mechanical energy through the interaction of two magnetic fields. One field is produced by a permanent magnet assembly and the other field is produced by an electrical current flowing in the motor windings. The two fields result in a torque that tends to rotate a rotor of the DC motor. As the rotor turns, the current in the windings is commutated to produce a continuous torque output. The permanent magnet (PM) motor is likely the most commonly used DC motor, but there are also other type of DC motors such as shunt that act in a similar fashion wherein the shunt wound field is permanently energized, and behaves like a permanent magnet.

In a permanent magnet motor, a coil of wire called the armature is arranged in the magnetic field of the magnet so that it rotates when a current is passed through it. A coil of wire moving in a magnetic field induces a voltage in the coil, and the current caused by applying a voltage to the coil therefore causes the armature to rotate and generate a voltage.

There is a back electromotive force (EMF) in the induced voltage caused by the armature's movement that tends to cancel out the applied voltage so that the actual voltage across the armature is the difference between the applied voltage and the back EMF. The value of the back EMF is determined by factors such as the speed of rotation and the strength of the magnet. It should also be apparent that if you apply more voltage the motor will speed up, apply less and it will slow, which is the basic function of a speed controller does, which varies the voltage applied to the motor.

DC motors typically operate from a direct current (DC) power source, wherein the movement of the magnetic field is achieved by switching current between coils within the motor in a process called "commutation". Many DC motors are brush-type, and have built-in commutation, so that as the motor rotates, mechanical brushes automatically commutate coils on the rotor. There are various forms of motor speed control of DC motors in the prior art. One method to control the rotation speed of a DC motor is to control the motor driving voltage. For example, the higher the voltage—the higher the speed of the motor. In many applications a simple voltage regulation causes a significant power loss on the control circuit, requiring a pulse width modulation (PWM) scheme for more efficient DC motor control. The PWM technique operates by alternating the operating power to the motors, by turning the motor "on" and "off" to modulate the current to the motor. It is the ratio of "on" time to the "off" time that determines the speed of the motor. For certain applications it is necessary to change the direction of rotation for the motor. Normal permanent magnet motors change the rotation by changing the polarity of the operating power, such as switching from negative power supply to positive. The change in direction is typically implemented using a relay or an H bridge circuit.

A brushless DC motor relies on an external power drive to perform the commutation of stationary winding, generally copper, on the stator. The changing stator field causes the permanent magnet rotor to rotate. A brushless permanent magnet motor is the normally the optimal choice with respect to torque versus weight, but are also more expensive.

Electronically commutated brushless DC motor systems are used as drives for blowers and fans used in electronics, telecommunications and industrial equipment applications. There is a wide variety of different brushless motors for various applications. Some are designed to rotate at a constant speed, such as in disk drives, while others control the speed by varying the applied voltage, such as the motors used in fans. Some brushless DC motors even have a built-in tachometer that generates pulses as the motor rotates. In the commercial environment, users select brush type DC motors when low system cost is a priority, and use brushless motors to satisfy higher end requirements.

There are numerous high volume commercial applications for DC motors and motor controllers. For example, the market for cellular phone vibrating motor systems, used to provide a silent "ringing" system is a 300 to 400 million units per year. In addition, the market for other simple motors is an additional 400 million/year. Therefore, even a small incremental cost saving is very significant.

It is reported by a major cell phone maker that this motor is one of the top failure mechanisms in cellular phones. These failures are caused by brush contact problems in brush type motors. These motors operate at a high speed, which is stressful on the brushes, making a brushless motor more attractive, though more costly.

There are many examples of pin sharing in the prior art. A concept of sharing a voltage supply and input pins is described in U.S. Pat. No. 3,735,378 relating to lighting systems and U.S. Pat. No. 5,247,239 discloses a voltage converter. U.S. Pat. No. 3,753,378 relates to a lamp failure indicating apparatus, wherein control signals generated from two detector networks detecting the operation of two lamp arrays are provided to an output amplifier through two diodes.

Pin sharing is also commercially available from companies such as National Semiconductor, Allegro Microsystems, and Melexis. Their datasheets generally show a method of sharing voltage supply with the output, in what is commonly called a two wire current loop. This configuration is well known in the art and illustrated in FIG. 1. The supply voltage 5 connects to the pin sharing circuit 10 and there is a current sensor 15 coupled to the supply line to sense the current into the device 10. A more common example of pin sharing it the common telephone that shares supply voltage with both input and output wires, with a switching system disposed between the phone company system and the residential phones.

Another example of pin sharing is described in U.S. Pat. No. 6,300,736 ('736), where there are no power supply pins. The power supply voltage for the Hall plate and Hall amplifier are taken from the "Off" output pin, through a switch. A complex digital controller synchronizes the Vdd switch and the gate drive of the power FETs to insure an uninterrupted Vdd. The block diagram of '736 illustrates this complex approach to sharing, requiring two voltage regulators, complex switching and timing circuitry, high voltage (40V) transmission gates, etc. The higher complexity of '736 is only a useful advantage in low voltage applications such as 2V or 3V, which are a very small portion of the total market for two phase brushless DC motors.

The Japanese Patent Application Laid-Open No. 4-317598 ('598) discloses a motor driving circuit and a fan driving circuit, wherein the fan driving circuit can be driven without providing a power supply by counter electromotive force generated in each coil while a motor is driven. The switching transistors are individually switched 'On' and 'Off' to rotate, and current caused by counter electromotive force, which is generated in each coil, enters into a fan driving circuit transistor capable of operating as a regulator. Thus, each terminal of each of the switching transistor switchably connects to the fan driving circuit transistor. The '598 patent does not disclose that the magnet sensor detects the rotor magnet, and that the regulator supplies power to the magnet sensor.

What is needed is a cost-effective and simplistic scheme for pin sharing. The pin sharing scheme should be flexible to allow incorporation in different designs. Such a scheme should also be practical for manufacturing concerns so as to be simple to incorporate into present manufactured designs. In addition, the pin sharing should reduce cost and complexity of manufactured designs.

SUMMARY OF THE INVENTION

The present invention has been made in consideration of the aforementioned background, and a general object is a device and method that reduces the cost of the motor controller chip. The present invention is an improved scheme for the sharing of pins between two or more functions. In this case voltage supply and output pins are shared, however other examples will be shown where voltage supply and inputs or outputs are shared as well. This invention focuses on a specific application with a simplified and improved method, saving significant cost that translates into other applications and fields that are appreciated by those skilled in the art.

A further object is a brushless motor combined with this novel proposed low cost and highly reliable circuit for sharing pins, thus eliminating a pin. The elimination of a pin offers a cost improvement and also a reliability improvement.

A preferred embodiment of the present invention utilizes simplified timing, where the switching simply follows the magnetic switching detected by the Hall sensor as the motor magnet passes. There are no added delays, and only very small propagation delays of the circuitry.

An object of the present invention is a controller using a diode instead of a switch, wherein a pair of power transistors is respectively connected to a voltage regulator through a diode and there are no switches. When the voltage of an output terminal of one of the power transistors is high, the power transistor is electrically connected to the voltage regulator. When the voltage of an output terminal of the other power transistor is low, it is not electrically connected to the voltage regulator. Accordingly, the two power transistors are electrically connectable to the voltage regulator. Even in a 'high' state where the voltages of the output terminals both become high as would momentarily appear during the full operation, the power transistors are switch-ably connected to the voltage regulator so the regulator can supply stabilized voltage to a magnetic sensor.

The present invention uses the inherent delays in the drive circuitry to avoid simultaneous conduction of both drivers. That is, when both drivers are switched ('On' to 'Off' and 'Off' to 'On') the conducting driver will be 'Off' before the other conducts. Simultaneous conduction is undesirable in that it creates noise and wastes power by trying to turn the motor both clockwise (CW) and counter clockwise (CCW) at the same time. By designing the drivers to turn 'On' slowly and turn 'Off' quickly, it can be seen that during the switching from one driver to the other, that both V1 and V2 will be high for a few microseconds, thereby eliminating the prior art problems. Slow 'On' is accomplished by using an RC delay such that the gate drive ramps slowly. Fast 'Off' is obtained by discharging the gate capacitance with an N-CH transistor that bypasses the RC delay.

One object of the invention is a pin sharing controller for a DC motor, comprising a supply voltage with a magnetic sensor that generates a sensor output signal based upon an imposed magnetic field. There is a first transistor coupled to said sensor output for switchably coupling to the supply voltage through a first output pin, with a second transistor coupled to an inverted sensor output for switchably coupling to the supply voltage through a second output pin. A voltage regulator is coupled to a first diode and to the first output pin, and coupled to a second diode and the second output pin, wherein the voltage regulator provides an operating voltage for the magnetic sensor.

A further object includes the pin sharing controller, wherein the controller is a package having three pins. It also encompasses the magnetic sensor being a Hall plate and a Hall amplifier. There can also be an inverter coupled to the second transistor providing the inverted sensor output. The transistors can be field effect transistors. The diodes can be selected from the group comprising integrated diodes and discrete diodes.

An additional object is the pin sharing controller, wherein the first transistor switchably connects to the first output pin when the output signal is 'Off'. In addition, wherein the second transistor switchably connects to the second output pin when the output signal is 'Off'. Furthermore, wherein the first transistor and said second transistor are not connected to the respective first and second output pins simultaneously.

Yet a further object includes wherein the controller system comprises a resistor/capacitor (RC) delay so the first and second transistor are slowly switched. It also includes a transistor bypass of the RC delay.

An object of the invention is a pin sharing controller for a DC motor, comprising a supply voltage and a magnetic sensor that generates a sensor output signal based upon an imposed magnetic field. There is a first transistor coupled to the sensor output for switchably coupling to the supply voltage through a first output pin. A second transistor is coupled to an inverted sensor output for switchably coupling to the supply voltage through a second output pin. A voltage regulator is coupled to a first resistor and to the first output pin, and also coupled to a second resistor and the second output pin, wherein the voltage regulator provides an operating voltage for the magnetic sensor.

Yet a further object is a pin sharing controller for a DC motor, comprising a supply voltage with a magnetic sensor that generates a sensor output signal based upon an imposed magnetic field and having a first transistor coupled to the sensor output for switchably coupling to the supply voltage through a first output pin. There is a second transistor coupled to an inverted sensor output for switchably coupling to the supply voltage through a second output pin. A first voltage regulator is coupled to a first diode and to the first output pin, and a second voltage regulator is coupled to a second diode and to a second output pin.

Other objects, features and advantages are apparent from description in conjunction with the accompanying drawings.

BRIEF DESCRIPTION OF THE FIGURES

The present invention will be readily understood by the following detailed description in conjunction with the accompanying drawings, wherein like reference numerals designate like structural elements, and in which.

DESCRIPTION OF THE PREFERRED EMBODIMENT

The foregoing description of the preferred embodiment of the invention has been presented for the purpose of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

Figure 1:
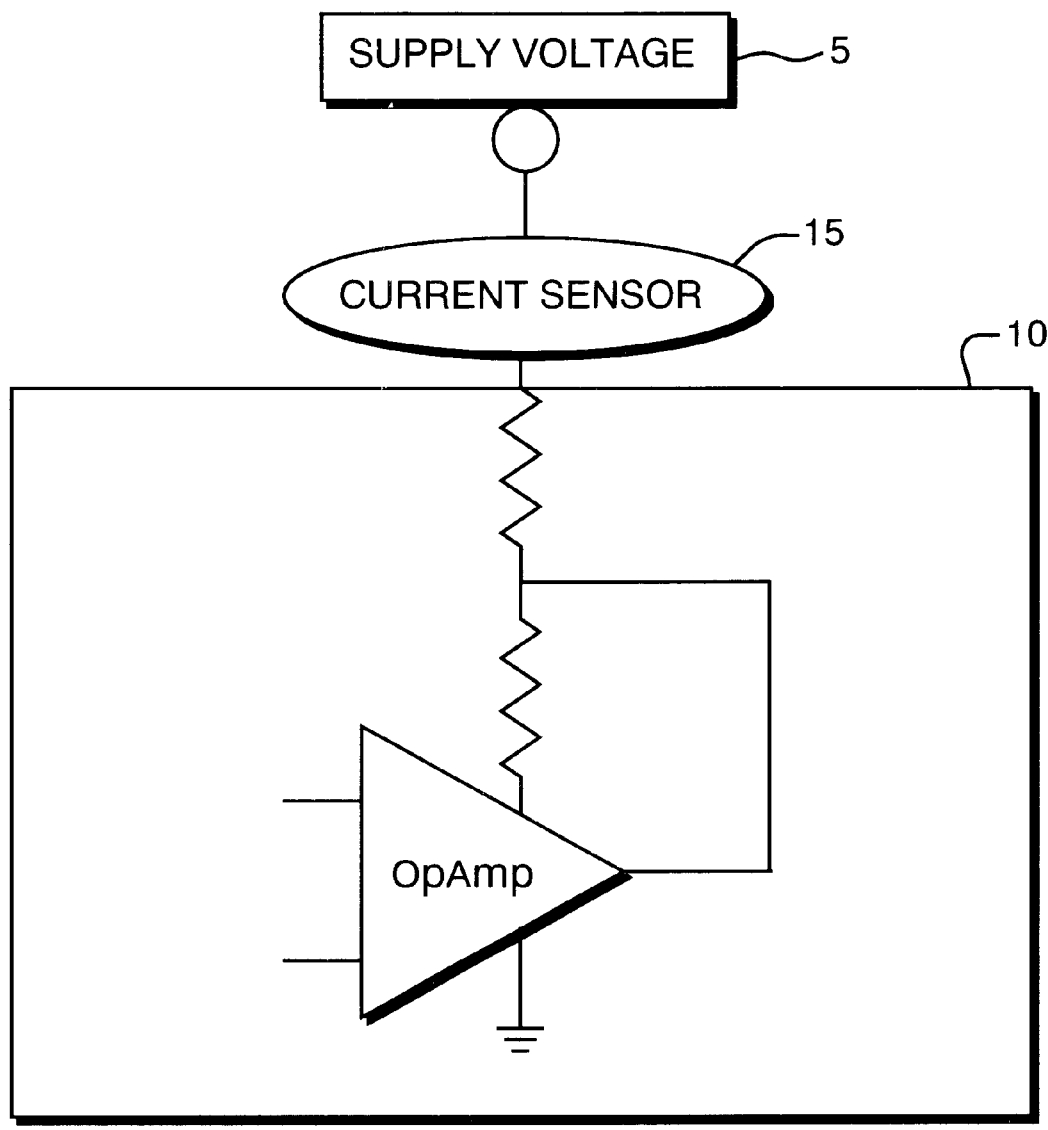
FIG. 1 prior art method of sharing voltage supply with output in a two wire current loop FIG. 2a application block diagram of a prior art circuit US79
Figure 2A:
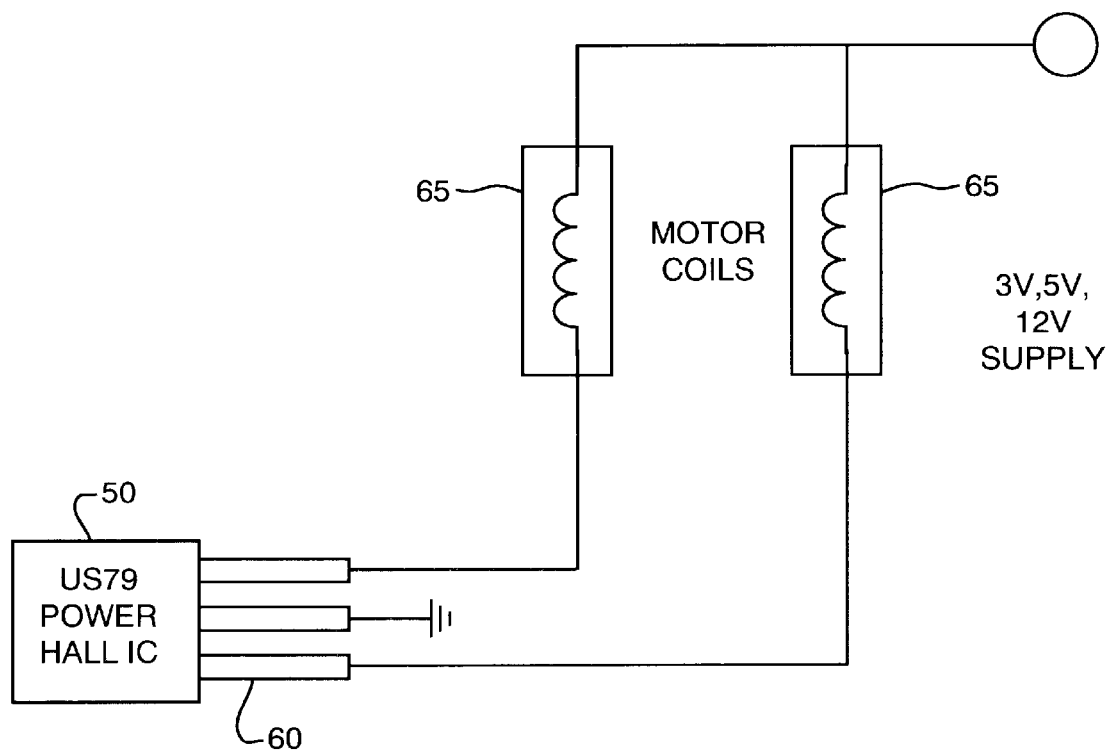
FIG. 2b schematic diagram of the prior art US79 circuit
Figure 2B:
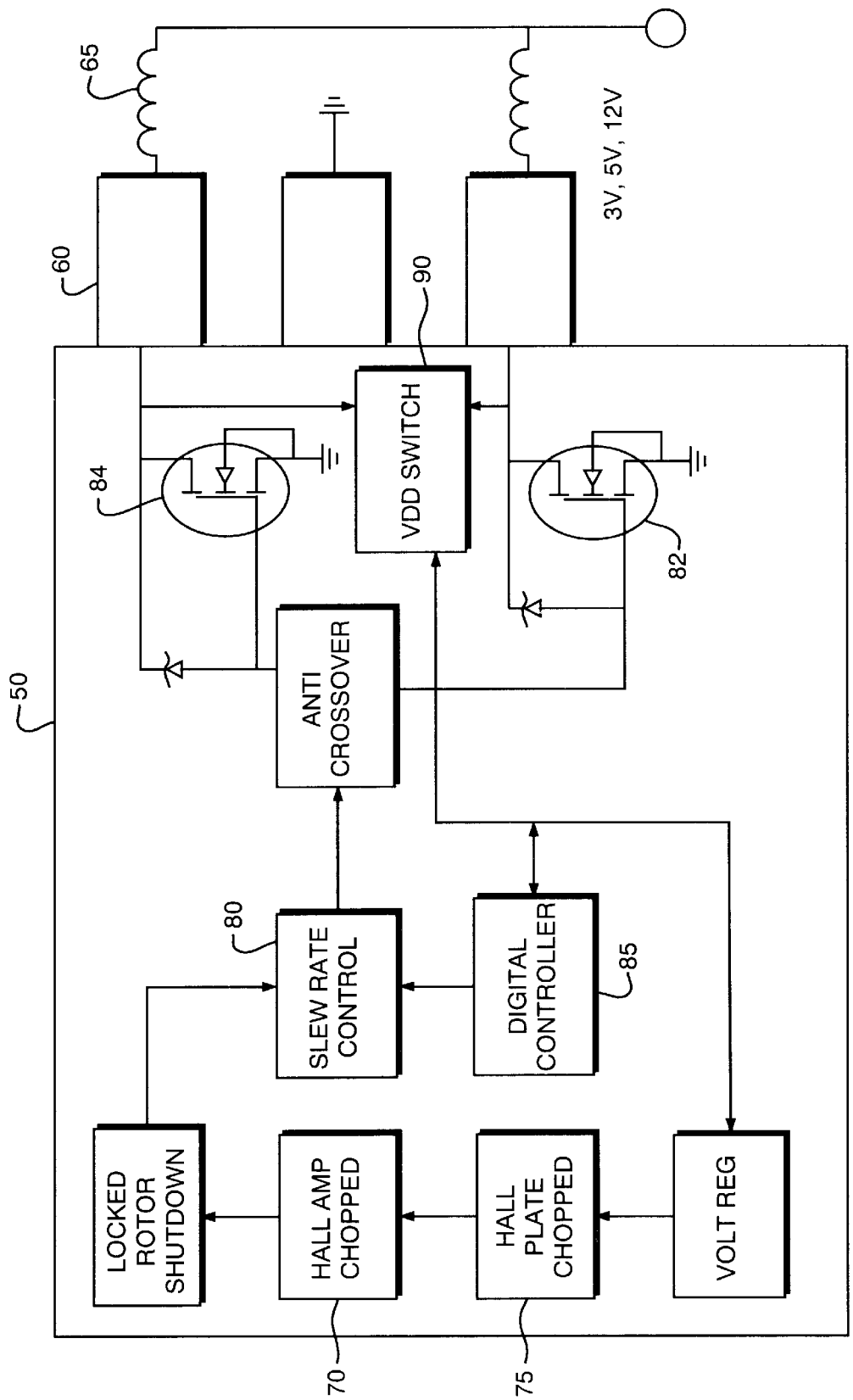

FIGS. 2a and 2b show the application and block diagrams of the US79, which is a prior art commercial product that helped eliminate components from predecessor designs but still required complex digital control. The drawings show the circuit interconnections of the Hall integrated circuit 50 with three output pins 60 and the equivalent filter formed by the motor stator coils 65. There is no power supply pin as the power supply voltage is provided from the 'Off' output pin via a switching scheme. The coil series resistance limits the fault current during supply voltage transients or reverse supply voltage. The series inductance and parasitic capacitance of the coil winding, provides a filter to attenuate ESD from external sources and attenuates RFI generated by the inductive switching of the driver transistors.

Essentially, the digital controller 85 works in conjunction with the Vdd switch 90 to figure out which of the output pins 60 is 'Off' to allow that pin to operate as the voltage supply pin for the circuit 50.

The Hall plate 75 and Hall amplifier 70 are "chopped" to provide a temperature stable, high sensitivity latch. Chopping dramatically reduces errors caused by Hall Plate and amplifier offsets. Chopping is a process whereby the Hall plate offset errors and amplifier offset errors are measured in a sample and hold circuit and cancelled with an anti-phase version of the same error voltage. Slew rate control 80 is used to prevent high voltage switching transients and RFI emission. This eliminates excessive power dissipation and the need for capacitors on the outputs. An anti-crossover logic circuit is used with the digital controller to prevent both drivers from being on simultaneously. Protection from over voltage conditions is accomplished by a Zener diode capable of dissipating supply voltage transients, switching transients and back EMF. A further description of the US 79 is contained in the article entitled "DC Cooling Fan Controller IC Eliminates Components and Failure Mechanisms", by Brad Marshall and Ted Kawaji, International IC—China Conference Proceedings, pages 320–327 and the US 79 data sheets.

Figure 3A:
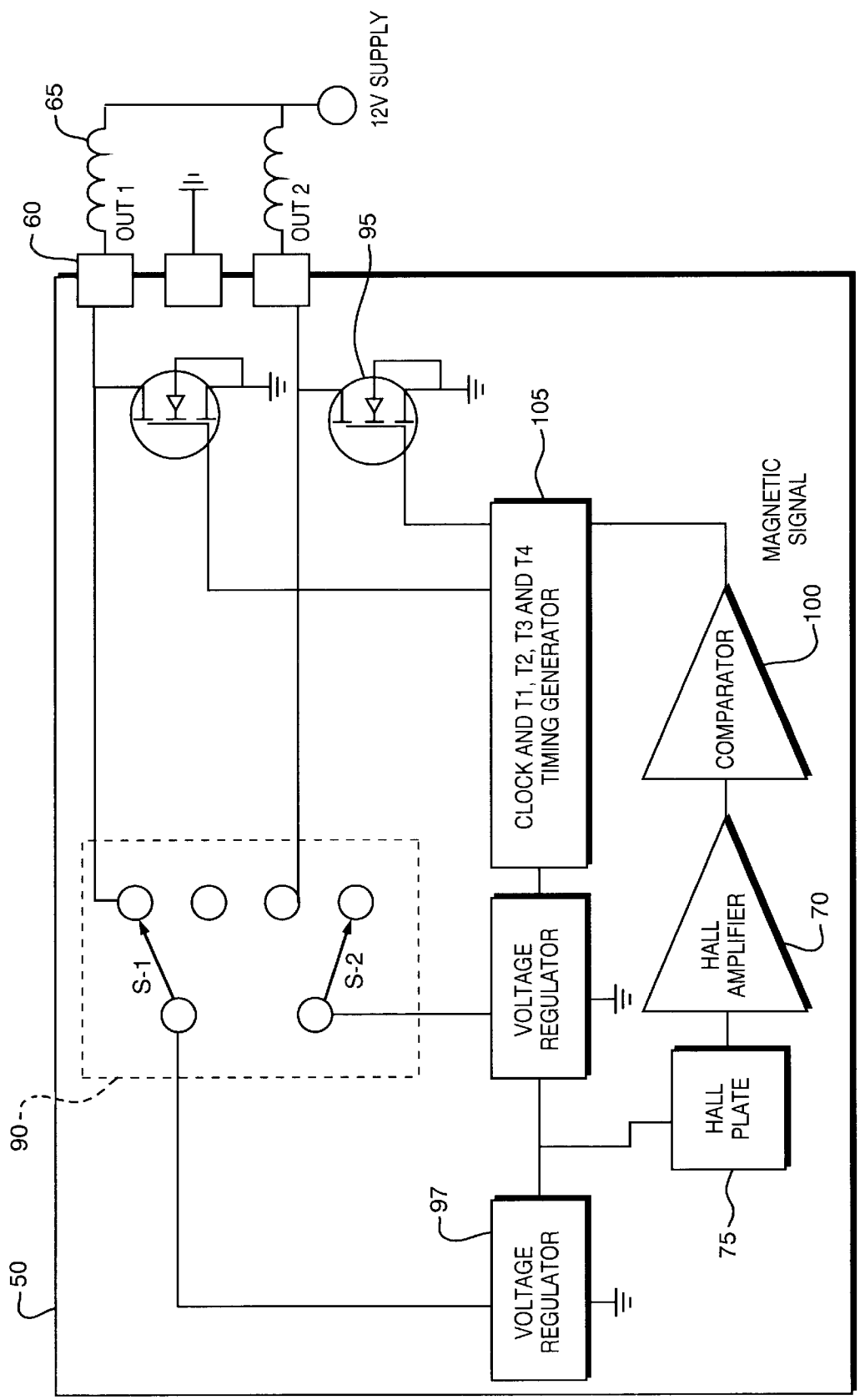
FIG. 3a detailed diagram for the switching and control mechanisms for the US79 circuit FIG. 3b timing diagram for the US79 circuit FIG. 4a simplified schematic circuit demonstrating diodes replacing prior art digital controller FIG. 4b simplified timing diagram for the diode implementation FIG. 5a simplified schematic circuit demonstrating resistors replacing prior art digital controller FIG. 5b simplified timing diagram for the resistor implementation FIG. 6a schematic circuit with diodes replacing prior art digital controller and having two voltage regulators FIG. 6b simplified timing diagram for the diode implementation FIG. 7a diagrammatic perspective showing the timing accomplished using the RC time delay FIG. 7b timing diagram for the RC switching FIG. 8a diagrammatic perspective showing the timing accomplished using the RC time delay and including a bypass transistor switch FIG. 8b timing diagram for the RC time delay with the capacitor shorted during turn-off

FIG. 3a provides a further illustration of the US 79 CMOS power Hall IC derived from U.S. Pat. No. 6,300,736 ('736). The '736 patent shows the complex timing operations and switching control requiring a digital controller that contains a clock/timing generator control circuit 105. This complex sequence was used to provide "make-before-break" switching, to insure that both drivers were not 'On' at the same time, and to avoid a "glitch" in voltage to the regulators. Simultaneous conduction is undesirable in that it creates noise and wastes power by trying to turn the motor both clockwise (CW) and counter clockwise (CCW) at the same time.

The coils 65 are driven by the power transistors 95, wherein the switching of the power transistors 95 is done via the control circuit 105. It is important that the switching be controlled in a manner that the switches S1 and S2 are never in the same state simultaneously. The Hall plate and Hall amplifier are configured as a magnetic sensing device such that the output of the amplifier switches between two defined states according to the imposed magnetic field. The magnetic field oscillates between threshold levels that trigger the Hall amplifier to latch a state until the next threshold is crossed.

Figure 3B:
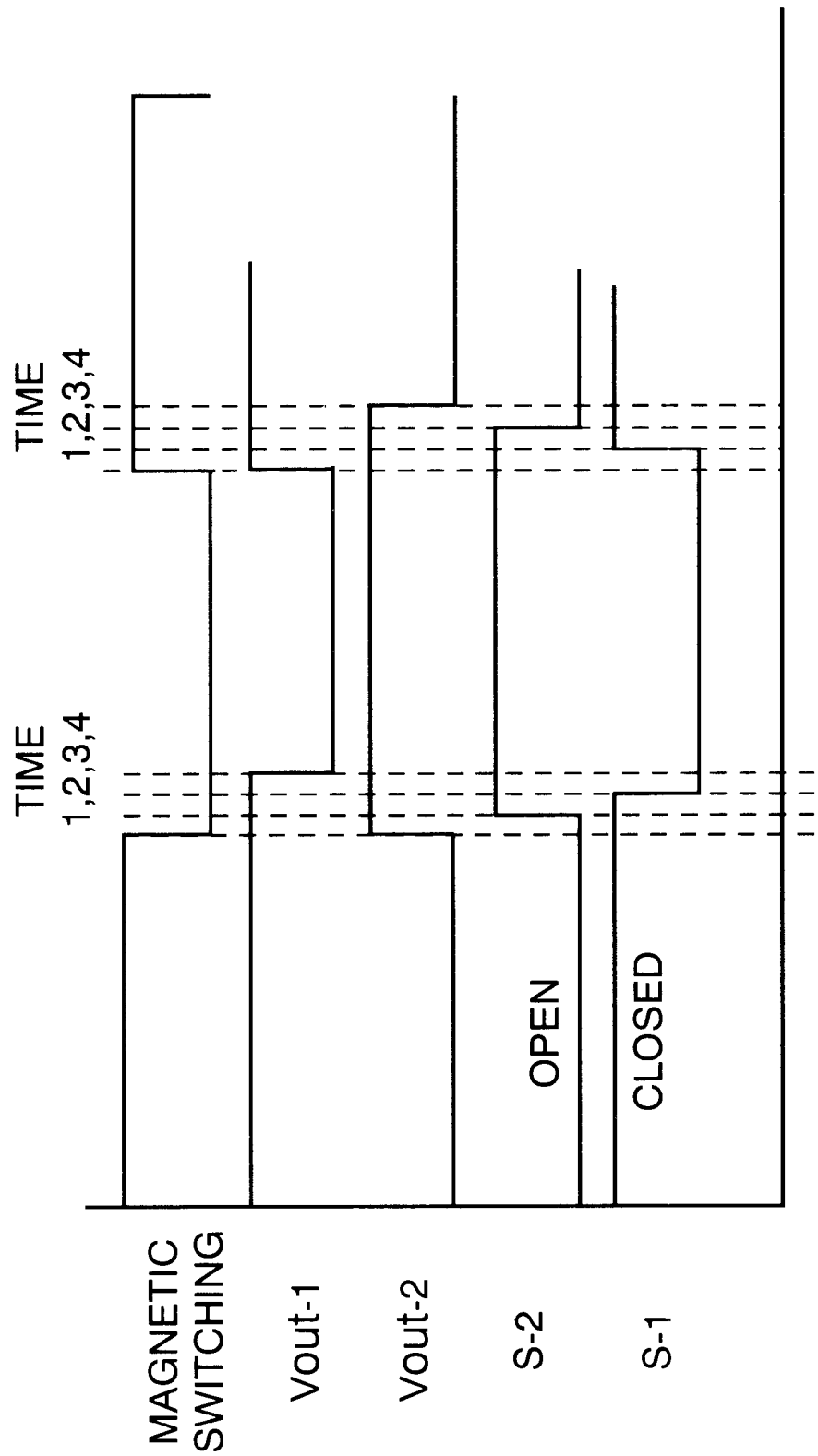

The control circuit 85 monitors the amplifier output states and generates the timing signals that switch the switches that correspondingly connect or disconnect the output pins to the voltage regulator. Switches are controlled so that only one pin is connected to the voltage regulator at a given time. For example, when the voltage on an output pin is 'High', which occurs as the respective power transistor is 'Off', the voltage regulator supplies the supply voltage to the circuit. The timing of the switching of the power transistors and the switches need to be precisely orchestrated in order for this circuit to function, which is detailed in the timing diagram of FIG. 3b The timing diagram depicts the relationship between the magnetic switching, V Out1, V Out2, S2 and S1. The time intervals 1, 2, 3, 4 show that S1 and S2 are never simultaneously connected in the same state, but that the timing and control of the switching is critical. There is little room for switching error or switch degradation in response.

The steps in the prior art switching process include:
1. At T1, the magnetic circuit detects the magnetic field and turns OFF Out 2, now both V1 and V2 are HIGH.
2. T2, S-2 closes applying voltage V2 to the regulator to insure that voltage regulators have a continuous supply.
3. T3, S-1 opens, now that V2 is supplied to Vreg, V1 is disconnected in preparation to turn on, going to approx. 0 Volts.
4. T4, Out 1 is turned on, following delays of T1 to T2, T2 to T3 and T3 to T4

Figure 4A:
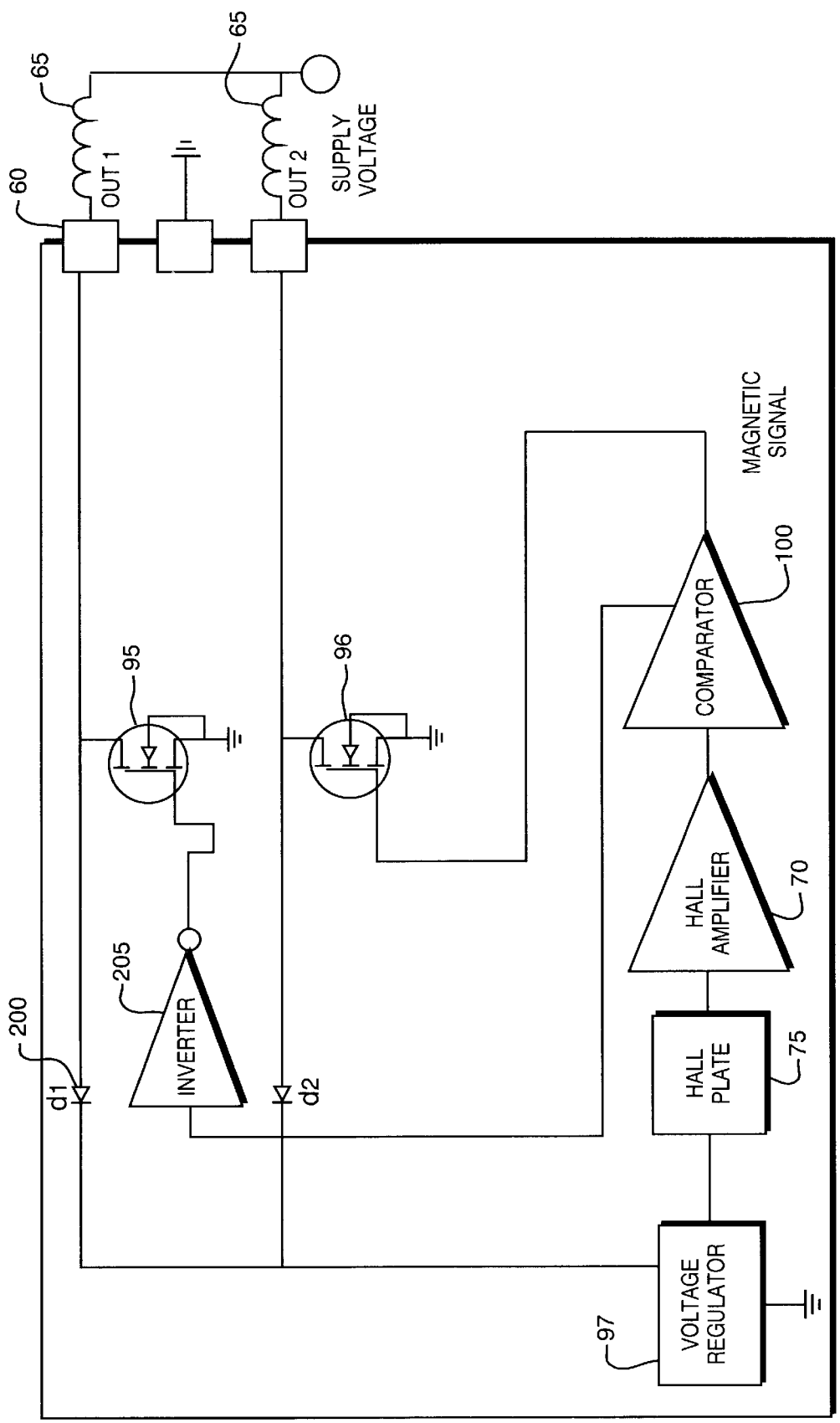
Figure 4B:
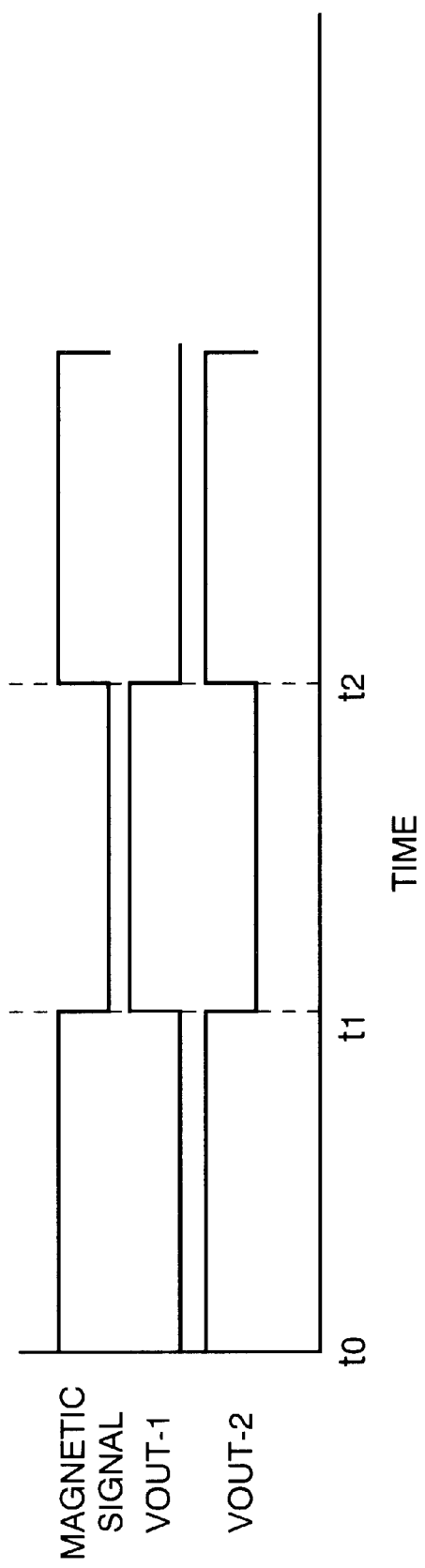
Figure 5A:
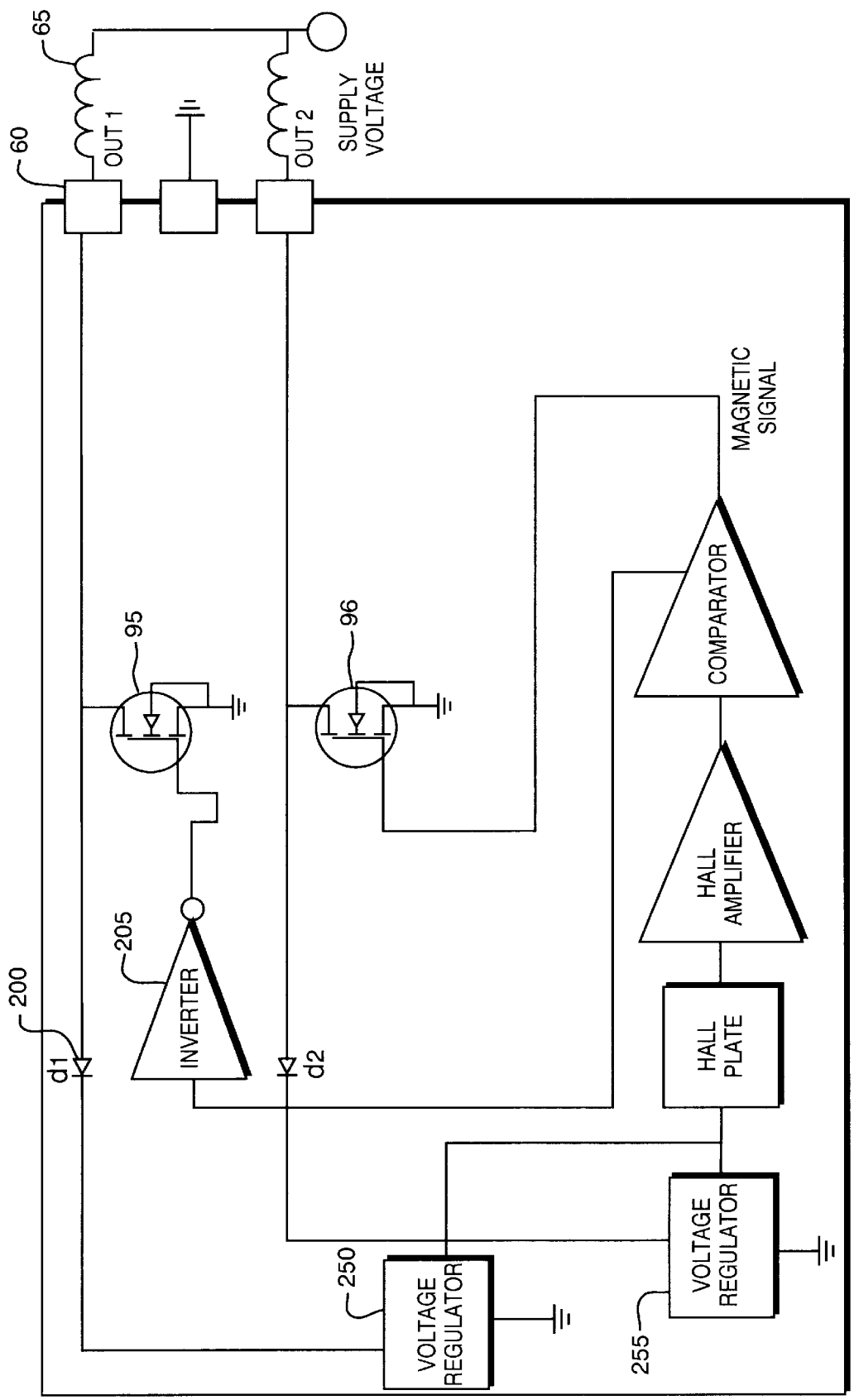
Figure 5B:
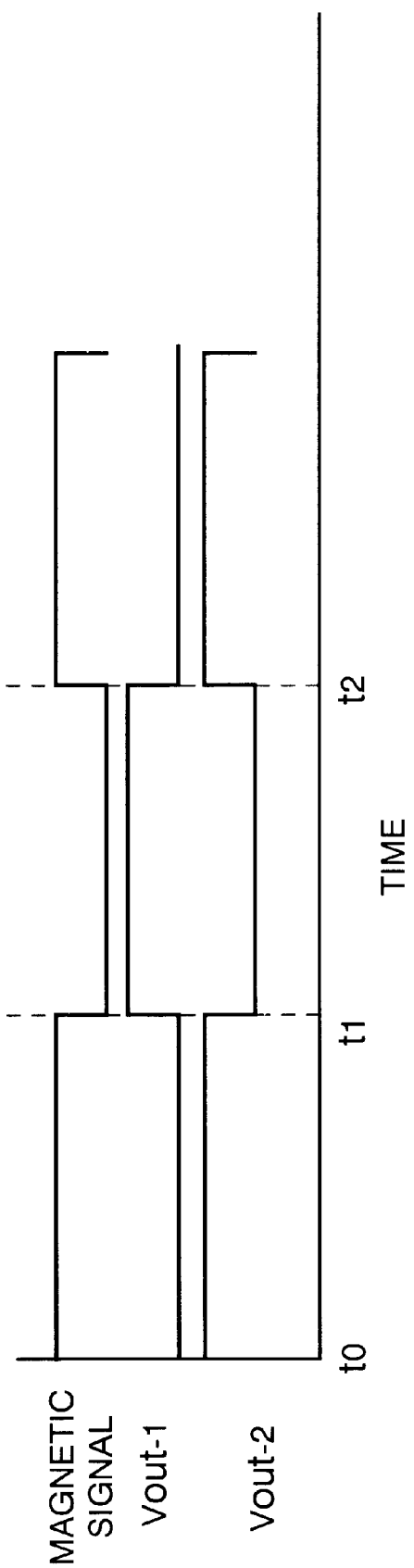

FIG. 4a and FIG. 5a show embodiments of the present invention and the simplified timing of FIGS. 4b, 5b, where the switching simply follows the magnetic switching detected by the Hall sensor as the motor magnet passes. There are no added delays, and only very small propagation delays of the circuitry. While functional, the complex and costly switching sequences of FIG. 3a prior art are eliminated by incorporating the inherent delays in the drive circuitry to avoid simultaneous conduction of both drivers. That is, when both drivers are switched ('On' to 'Off' and 'Off' to 'On') the conducting driver will be 'Off' before the other conducts.

Referring to FIG. 4a, a pair of diodes 200 and an inverter 205 replace the complex control circuitry of the prior art and couple the 'Off' phase to the power supply. Whereas, in the circuit of FIG. 3a, the 'Off' phase is connected to a regulator by a CMOS switch, the present invention uses a simple diode switching scheme. The diodes 200 can be integrated or discrete depending upon the application. As previously described, the Hall circuit generates a signal in relation to a threshold value of the magnetic signal that is output from the comparator 100 to the power transistors 95, 96. The comparator 100 conditions the signal so that it triggers the power transistors 95, 96. One of the power transistors 95 has an inverter 205 so only one power transistor is operative at a given instant from the comparator 100 output. Depending upon which power transistor 95, 96 is 'Off', the power supply voltage couples through the respective diode 200 to a single voltage regulator 97, while the other power transistor 95, 96 sends a signal to the coils 65 of the DC motor. Only one power transistor 95, 96 is 'Off' at any given time, thereby providing a constant supply voltage to the circuit.

The timing diagram of FIG. 4b is greatly simplified and the 'break before make' scheme of the prior art is no longer required. At t0, the magnetic signal is 'high', power transistor 96 is 'On' and Vout-2 is 'high' supplying the voltage to the coils 65. Power transistor 95 is 'Off' and the supply voltage is coupled to the voltage regulator 97. At t1, a transition in the magnetic field as sensed by the hall plate changes the magnetic signal from a 'high' to a 'low'. The comparator 100 follows the magnetic signal and changes from a 'high' to a 'low'. The power transistor 96 turns 'Off' and Vout-2 goes from 'high' to 'low'. The inverter 205 supplies a 'high' signal to the power transistor 95 that causes a 'high' signal on Vout-1. The supply voltage previously supplied to the voltage regulator 97 through Vout-1 is now supplied by Vout-2. At time t2, the switching continues in a similar fashion.

Depending on circuit capabilities, a version using two regulators may be used, but with a corresponding increase in cost. Such an embodiment is shown in FIG. 5a with the timing diagram of FIG. 5b. In this embodiment the diode 200 scheme is displayed with each diode d1 and d2 connected to a respective voltage regulator 250, 255. While displayed with the diode scheme, it should be readily apparent that the resistor scheme having two voltage regulators 250, 255 is within the scope of the invention and functions in a similar manner as previously detailed.

Figure 6A:
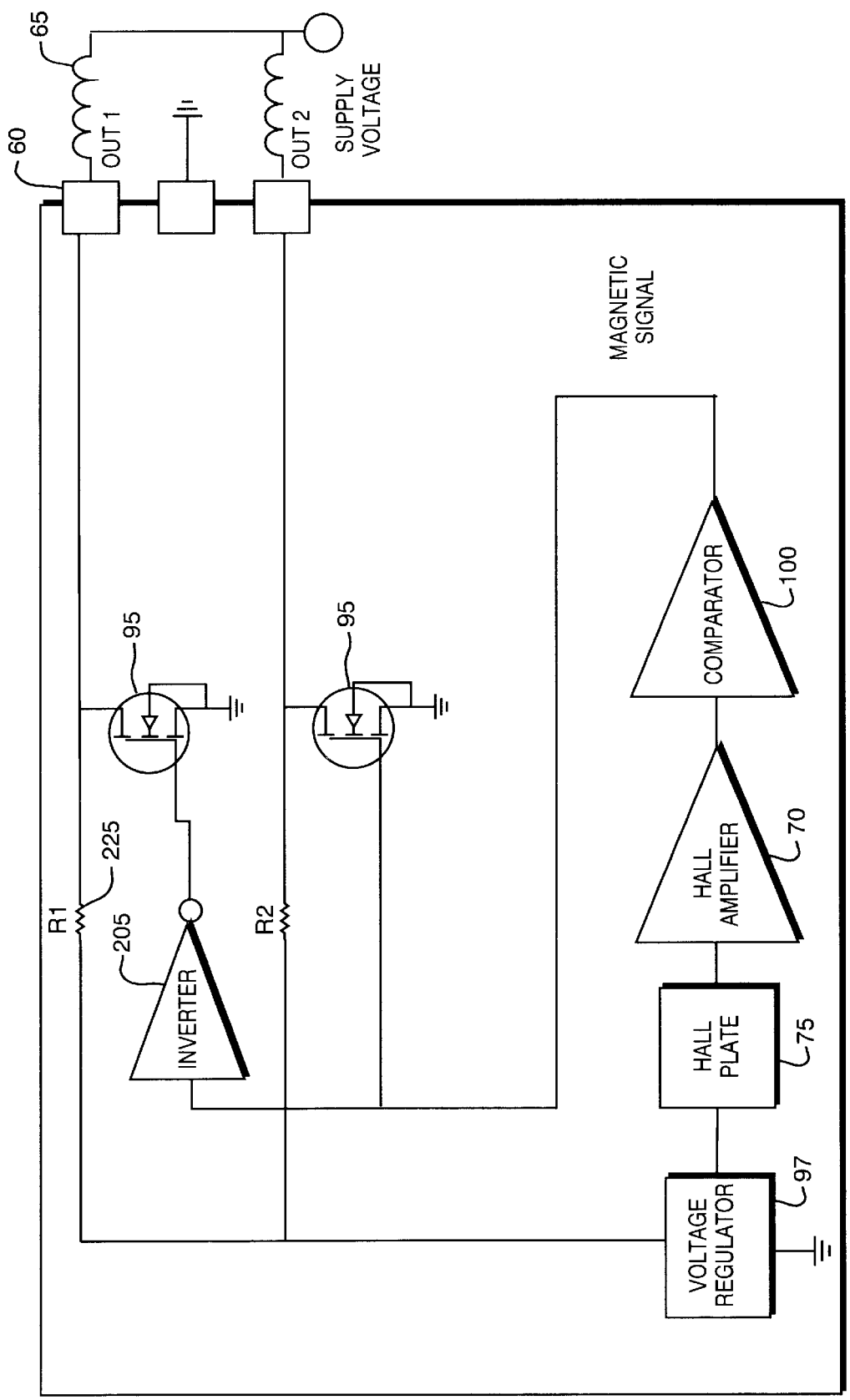
Figure 6B:
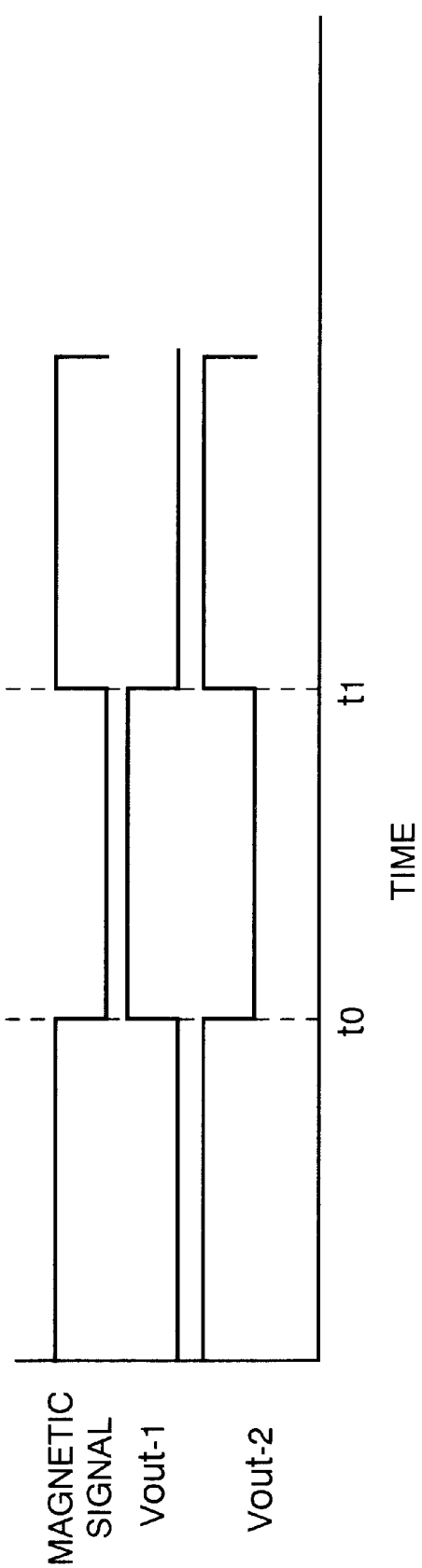

In a similar fashion, FIGS. 6a and 6b show a simplified embodiment of the prior art, wherein the diodes of FIG. 4a are replaced by resistors 225. The Hall elements 70, 75 functions as previously described and the latch output operates to turn 'Off' one of the power transistors 95, 96 thereby connecting a voltage supply to the single voltage regulator 97.

Figure 7B:
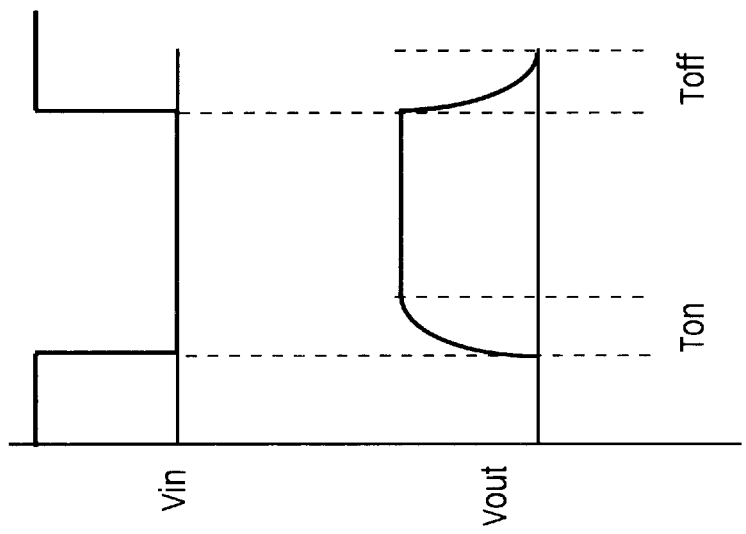
Figure 7A:
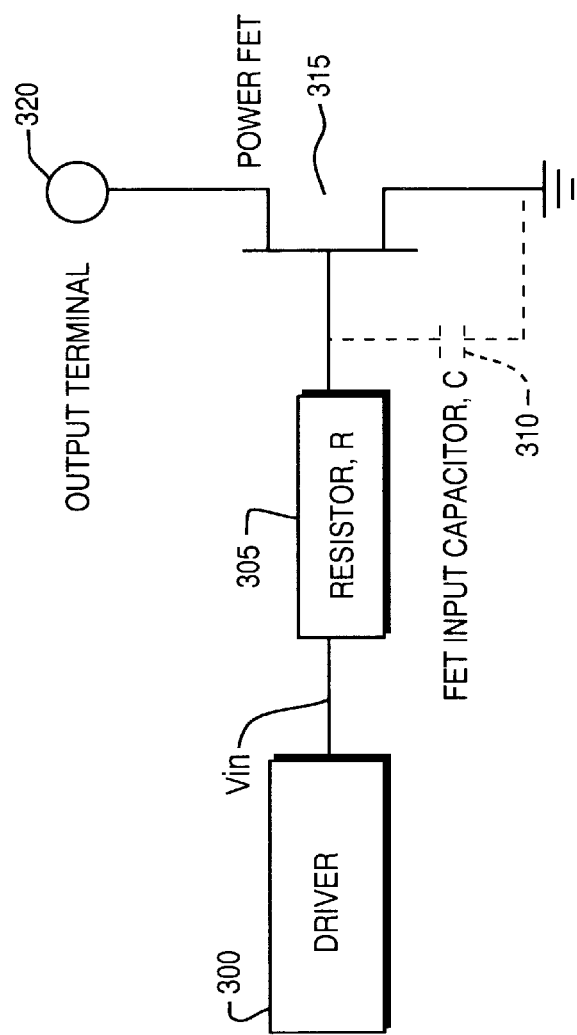

The RC switching is further illustrated in FIG. 7a, that illustrates in block presentation that the driver 300 supplies a Vin to an RC delay formed by resistor 305 and capacitor 310. The RC delay in this embodiment are equal and the delay effects are shown in FIG. 7b with the Ton and Toff. As the Vin goes from 'high' to 'low', the Vout transitions from 'low' to 'high' with a corresponding delay.

Figure 8B:
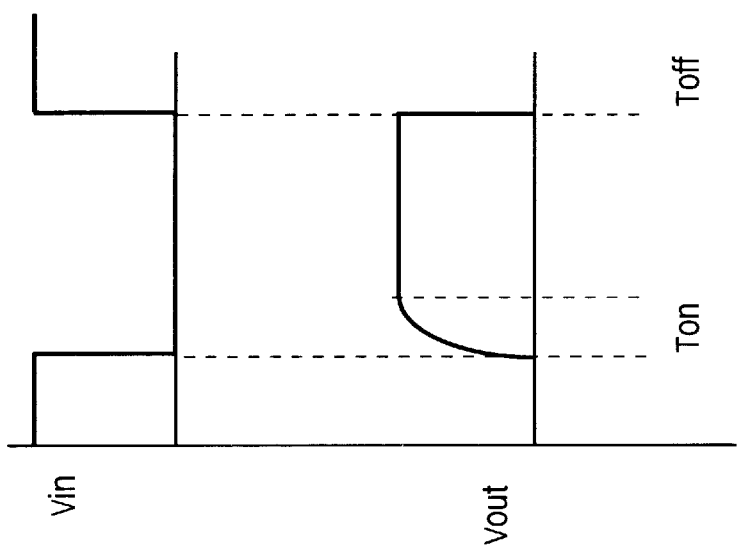
Figure 8A:
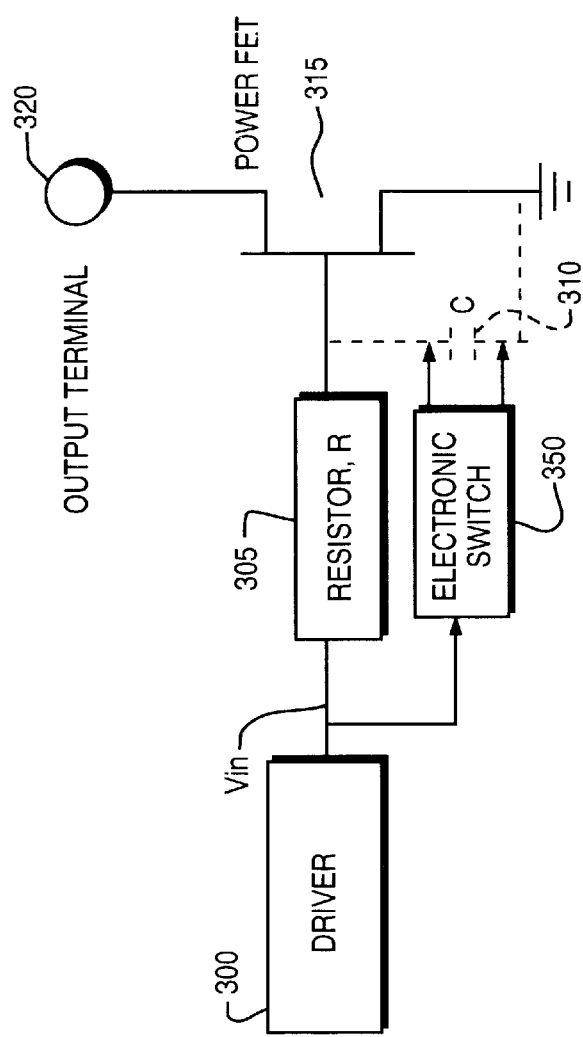

Another embodiment incorporating a bypass is depicted in FIG. 8a. By designing the driver 300 to each power transistor 315 to turn 'On' slowly and turn 'Off' quickly, it can be seen that during the switching from one driver 300 to the other, that both V Out1 and V Out 2 will be high for a few microseconds. Slow 'On' is accomplished by using an RC delay such that the gate drive ramps slowly. Fast 'Off' is obtained by discharging the gate capacitance with an N-CH transistor that acts as a switch 350 that shorts the capacitor 310. As shown in FIG. 8b, the delay curve of Ton is greatly diminished with the sharp response of Toff.

It should be noted that the resistor values are not important and possible ranges include between 1K to 50K ohms (or a current source). For illustrative purposes, assume resistors are 10K ohms. The capacitance for the RC delay is the gate capacitance at the input to the FET that might be about 20 pF. Slow 'On' is with a resistor in series with the gate capacitance, while Fast 'Off' is a transistor to ground at the gate to discharge without the resistor.

In the preferred embodiment, there is a single voltage regulator, no timing circuits are used, and the high voltage transmission gates eliminated, thus saving approximately 20% of the chip area. Schottky diodes may be used to operate at lower voltages. As described herein, timing circuits are actually not needed in order to get proper operation, but may provide lower noise or lower power dissipation, but at a significant increase in cost.

In summary, the present invention eliminate the complex timing and associated digital circuitry used in the prior art. The delays utilized in the prior art provide un-necessary delays and complexity used to prevent simultaneous conduction and momentary loss of power supply voltage. The improved circuits and variations of the present invention shown in FIGS. 4a, 5a, 6a, 7a and 8a uses diodes or resistors to replace the on-chip digital controller to couple the 'Off' phase to the power supply. One of the distinguishing attributes as compared to the prior art is the use diodes/resistors for control of the switching functionality.

Numerous characteristics and advantages have been set forth in the foregoing description, together with details of structures and functions of the present invention, and some of the novel features thereof are pointed out in appended claims. The disclosure, however, is illustrative only, and changes may be made in arrangement and details, within the principle of the invention, to the full extent indicated by the broad general meaning of the terms in which the appended claims are expressed. For example, the description of screws for the various securing members can be replaced by other members that are known in the art. The objects and advantages of the invention may be further realized and attained by means of the instrumentalities and combinations particularly pointed out in the appended claims. Accordingly, the drawing and description are to be regarded as illustrative in nature, and not as restrictive.

What is claimed is:

1. A pin sharing controller for a DC motor, comprising:
   a supply voltage;
   a magnetic sensor that generates a sensor output signal based upon an imposed magnetic field;
   a first transistor coupled to said sensor output for switchably coupling to said supply voltage through a first output pin;
   a second transistor coupled to an inverted sensor output for switchably coupling to said supply voltage through a second output pin;
   a voltage regulator coupled to a first diode and to said first output pin, and coupled to a second diode and said second output pin, wherein said voltage regulator provides an operating voltage for said magnetic sensor.

2. The pin sharing controller according to claim 1, wherein the controller is a package having three pins.

3. The pin sharing controller according to claim 1, wherein the magnetic sensor comprises a Hall plate and a Hall amplifier.

4. The controller system of claim 1, further comprising an inverter coupled to said second transistor providing said inverted sensor output.

5. The controller system of claim 1, wherein first and second transistors are field effect transistors.

6. The controller system of claim 1, wherein said first and second diodes are selected from the group comprising integrated diodes and discrete diodes.

7. The pin sharing controller according to claim 1, wherein the first transistor switchably connects to said first output pin when said output signal is Off.

8. The pin sharing controller according to claim 1, wherein the second transistor switchably connects to said second output pin when said output signal is Off.

9. The pin sharing controller according to claim 1, wherein the first transistor and said second transistor are not connected to said respective first and second output pins simultaneously.

10. The controller system of claim 1, further comprising a resistor/capacitor (RC) delay so said first and second transistor are slowly switched.

11. The controller system of claim 10, further comprising a transistor bypass of said RC delay.

12. A pin sharing controller for a DC motor, comprising:
    a supply voltage;
    a magnetic sensor that generates a sensor output signal based upon an imposed magnetic field;
    a first transistor coupled to said sensor output for switchably coupling to said supply voltage through a first output pin;
    a second transistor coupled to an inverted sensor output for switchably coupling to said supply voltage through a second output pin;
    a voltage regulator coupled to a first resistor and to said first output pin, and coupled to a second resistor and said second output pin, wherein said voltage regulator provides an operating voltage for said magnetic sensor.

13. The pin sharing controller according to claim 12, wherein the controller is a package having three pins.

14. The pin sharing controller according to claim 12, wherein the magnetic sensor comprises a Hall plate and a Hall amplifier.

15. The controller system of claim 12, further comprising an inverter coupled to said second transistor providing said inverted sensor output.

16. The controller system of claim 12, wherein said first and second resistors are selected to provide an RC delay so said first and second transistor are slowly switched.

17. The controller system of claim 12, further comprising a transistor bypass of said RC delay.

18. The pin sharing controller according to claim 12, wherein the first transistor switchably connects to said first output pin when said output signal is Off.

19. The pin sharing controller according to claim 12, wherein the second transistor switchably connects to said second output pin when said output signal is Off.

20. The pin sharing controller according to claim 12, wherein the first transistor and said second transistor are not connected to said respective first and second output pins simultaneously.

21. A pin sharing controller for a DC motor, comprising:
    a supply voltage;
    a magnetic sensor that generates a sensor output signal based upon an imposed magnetic field;
    a first transistor coupled to said sensor output for switchably coupling to said supply voltage through a first output pin;
    a second transistor coupled to an inverted sensor output for switchably coupling to said supply voltage through a second output pin;
    a first voltage regulator coupled to a first diode and to said first output pin; and
    a second voltage regulator coupled to a second diode and to said second output pin.

22. The pin sharing controller according to claim 21, wherein the magnetic sensor comprises a Hall plate and a Hall amplifier.

* * * * *